United States Patent [19]

Petcavich et al.

[11] Patent Number: 5,803,946
[45] Date of Patent: Sep. 8, 1998

[54] CONTROLLED RELEASE PLANT NUTRIENTS

[75] Inventors: Robert J. Petcavich; Xiaoming Yang, both of San Diego, Calif.

[73] Assignee: Planet Polymer Technologies, Inc., San Diego, Calif.

[21] Appl. No.: 666,226

[22] Filed: Jun. 20, 1996

[51] Int. Cl.$^6$ ........................................... C05C 9/00
[52] U.S. Cl. ................. 71/64.11; 71/64.07; 71/64.11; 71/64.13
[58] Field of Search ................ 71/28–30, 64.02, 71/64.07, 64.11, 64.12, 64.13; 427/212; 428/334

[56] References Cited

U.S. PATENT DOCUMENTS

| | | | |
|---|---|---|---|
| 4,711,659 | 12/1987 | Moore | 71/93 |
| 4,772,490 | 9/1988 | Kogler et al. | 427/212 |
| 4,804,403 | 2/1989 | Moore | 71/28 |
| 4,880,455 | 11/1989 | Blank | 71/28 |
| 4,969,947 | 11/1990 | Moore | 71/28 |
| 4,970,117 | 11/1990 | Durdevani et al. | 428/334 |
| 4,979,980 | 12/1990 | Thaler et al. | 71/64.02 |
| 4,988,377 | 1/1991 | Manalastas et al. | 71/28 |
| 5,211,985 | 5/1993 | Shirley, Jr. et al. | 427/213 |

OTHER PUBLICATIONS

"Controlled Release Fertilizers", Dr. Robert Powell, Noyes Development Corporation, 1968, pp. 169–174. No Month.

"Developing a Biodegradable Film for Controlled Release of Fertilizer", Plastics Engineering, Jan. 1994, pp. 19–21.

"Modified Rosin–Parafin Wax Resins as Controlled Delivery Systems for Fertilizers, Fabrication Parameters Governing Fertilizer Release in Water." Ind. Eng. Chem. Res., vol. 33, No. 6, 1994, pp. 1623–1630. No Month.

"A Study of the Slow Release of Urea From Microcapsules with TDI as the Wall–Sealing Treatment". 19–Fert., Soils, Plant Nutr., vol. 104, 1986, Abstract 104: 224181 No Month.

The Comprehensive Resource for Polyurethans, Dow Plastics, 1994. No Month.

"Specialty MDI Isocyanates with FDA Approval", (Rubinate), ICI Polyurethanes Group, ICI Americas, Inc. No Date.

"Principles of Polyurethane Chemistry and Special Applications", Dieterich et al, Polyurethane, pp. 11–16. No Date.

*Primary Examiner*—Ferris Lander
*Attorney, Agent, or Firm*—Juettner Pyle Lloyd & Piontek

[57] ABSTRACT

Plant nutrients that are released in soil over a controlled period of time are comprised of plant nutrient particles containing urea and on the surface of the particles a water insoluble, biodegradable, interpenetrating polymer network comprised of a biuret, a urethane and tung oil; more specifically, an interpenetrating network comprised of the reaction product of the urea and an isocynate reactive with urea, the reaction product of the isocyanate and an alcohol reactive with isocyanate to form a urethane, and the reaction product of the urethane and tung oil. A method of making the controlled release plant nutrient conveniently and economically is also disclosed.

18 Claims, No Drawings

CONTROLLED RELEASE PLANT NUTRIENTS

FIELD OF THE INVENTION

The present invention relates to plant nutrients that are released in soil over a controlled period of time and to methods of making the same. The invention is particularly concerned with urea fertilizers.

BACKGROUND

Urea in particulate form is an excellent and economical source of nitrogen to stimulate plant growth. Unfortunately, it is rapidly soluble in water. In spring rains, for example, the water soluble plant nutrient is quickly flushed away thereby (a) depleting its efficacy as a plant food, (b) potentially causing phytotoxicity to the plants, and (c) causing the nutrients to migrate to and contaminate the ground water and local wells and streams.

Researchers have for a long time attempted to develop particles which release nutrients at a rate about equal to their uptake by plants to minimize phytotoxicity and maximize use efficiency. Improved release control has been achieved primarily with nitrogen in the form of urea by substantially reacting it with aldehydes to form insoluble products such as ureaform, which must chemically decompose in the soil before the nitrogen becomes available for utilization by plants. Another method consists of physically coating fertilizer granules with solidified water insoluble melts. Various materials have been used as coatings, including sulphur, paraffin waxes, vegetable oils and plastics. These coatings must be broken down by erosion, internal vapor pressure, microbes, or attrition before the contained nutrients become available.

Attrition in producing, storing, handling, and applying the coated products prematurely breaks down the coatings causing substantial loss of release control and excessive nutrient leaching. These problems and other disadvantages associated with the coated products cause the nitrogen not to be available for plant uptake in a reasonable time period, or cause the nitrogen release rate to be so high as to cause ground water contamination and other problems when substantial amounts of the nutrients are applied. Additionally, since there is no direct chemical bonding between the plant food and the coating material, the release rate of the plant food is not rigidly controlled as a result of cracking and break down of the coatings, leading to uncontrolled release of the plant food.

Although many efforts have been made to provide improved coating techniques so as to accurately control the release rate of the plant food, it has not been possible to provide a material free from the above noted shortcomings. It has long been an object of those skilled in the art to produce controlled release fertilizers having substantial resistance to attrition from shipping, handling and application by applying economically small amounts of coating material to the fertilizers such that the rate of fertilizer release is consistently controlled.

For example, U.S. Pat. No. 4,711,659, 4,804,403 and 4,969,947 disclose coated fertilizers comprising a water soluble central mass containing nucleophilic reactive functional groups surrounded by and chemically bonded to a base coating formed by reacting a coupling agent with the nucleophilic groups of the central mass and the functional groups of a material which will form, by reaction with the coupling agent, a water insoluble layer. In such a coating system, $NH_2$ containing water soluble central particles such as urea are surrounded and chemically bonded with a base coating formed by reacting a polyfunctional isocyanate with the amino groups of the central particles and at the same time reacting the polyisocyanate with an anhydrous organic polyol as a second reactive material to form a water insoluble layer surrounding and chemically bonded with the base coating.

While initially promising, none of these prior art proposals has fully satisfied the requirements of the art. A water insoluble, urea containing, plant food product having time controlled release in soil remains a high priority of the industry.

SUMMARY OF THE INVENTION

The primary object of the present invention is to provide controlled release plant nutrient products that are insoluble in water, biodegradable in soil, release their nutrients into the soil over a controlled period of time, have high resistance to attrition in production, packaging, handling and application, and otherwise fulfill the requirements of the industry.

Another object is to provide controlled release plant nutrient products that are free flowing, essential dustless, convenient and safe to work with, and easy to apply using conventional fertilizer application equipment.

A further object is to provide controlled release plant nutrient products wherein the ratio of nutrients to control agents is extremely high, the controlled release is achieved at minimal expense, and the plant food is economical to use.

It is yet another object of the invention to provide a method of producing the improved controlled release plant nutrient products in an economical, practical and facile manner.

A still further object is to provide a method that does not require the use of solvents.

In accordance with the invention, water soluble particulate plant nutrients comprised of or having urea on the surface thereof are rendered insoluble and biodegradable by transforming the surface into an interpenetrating polymer network resistant to water but susceptible to microbial attack.

The interpenetrating polymer network is comprised of a biuret, a urethane and tung oil interlinked one with another. Preferably, the biuret is a reaction product of the urea on the surface of the nutrient particles and a polyisocyanate, and the urethane is a reaction product of the polyisocyanate and an alcohol. The tung oil is cross-linked into the network by reaction with the urethane, preferably, in the presence of a cross linking initiator or promotor.

The surfaces of the resultant nutrient particles are hard, tough, resistant to shock and abrasion, shiny, uniform, dustless and nontacky. The particles form a free flowing, essentially dustless and convenient to use plant food product.

The method of the invention is convenient and easy to practice and is most expeditiously carried out as the final step in the fertilizer manufacturing process, i.e., immediately at the discharge end of the fertilizer manufacturing line. In accordance with the method of the invention, the particulate nutrients being discharged from the manufacturing line are fed into a suitable apparatus for creating a mobile mass of the particles, e.g., a coating drum, a fluidized bed, or the like, which serves to create a mobile mass of particles within which the particles are moved in a more or less tumbling or rolling motion so that each particle is from time to time exposed at the surface of the mass.

Isocyanate, alcohol, tung oil and, optionally but preferably, an initiator are then applied to the mobile, tumbling mass of particles to cause the surfaces of the same to be transformed into the interpenetrating polymer network above described. The isocyanate, alcohol, tung oil and initiator may be applied sequentially, or in respective sequential groups or mixtures, or substantially simultaneously.

The method of the invention is therefore very efficient and inexpensive to practice and produces an economical controlled release plant nutrient having all of the characteristics and features desired by the industry.

The invention additionally provides the advantage that the method and the resultant polymer network are solvent-free and comprised of 100% reacted solids.

These and other objects, features and advantages of the invention will become apparent to those of reasonable skill in the art from the following detailed description.

DETAILED DESCRIPTION OF THE BEST MODE OF CARRYING OUT THE INVENTION

The following is a detailed description of preferred embodiments of the invention presently deemed by the inventors to be the best mode of carrying out the invention.

The invention in its preferred embodiments is employed to control the release time of fertilizers comprised in whole or in principal part of urea. However, the starting material may be any chemical or chemical compound or compounds normally used for plant nutrition and comprised of discrete particles having urea at or on the exterior surface thereof.

In practice of the invention, the particles should preferably have a high degree of uniformity or regularity and a low surface area per unit of weight. Particles of uniform shape and size and having a low surface area to weight ratio are generally recognized to be the most efficiently coated with the least amount of coating materials.

The method of the invention can be carried out effectively by creating a mobile mass of the particulate plant nutrients in any one of a variety of devices including rotary drums, fluidized beds, rotary pans, falling film contactors, conical blenders, and agitated conveyers. These devices impart mobility to the nutrient particles and induce a rolling or tumbling movement of the particles in the mass, so that the surfaces of the particles are at least periodically exposed for topical application thereto of a material, e.g., a coating material, which may be applied to the particles in liquid, fluent or powder form by pouring, spraying or mixing.

Drum and pan coating devices are used extensively in various industrial processes and lend themselves well to the processing of particulate materials, in both continuous in line processes and batch processes.

In accordance with the invention, a mobile mass of particles is treated with a polyfunctional isocyanate which reacts with the urea on the surface of the particles to form a biuret, i.e., a condensation product of urea with isocyanate. The amount of polyisocyanate applied to the particles is in excess of that required to react with the urea containing surfaces of the particles, the excess being sufficient to support the next described reaction and preferably being in the order of about 10 to about 15 times the amount required to transform the surface of the particles into a biuret. The polyfunctional isocyanate preferred for practice of the invention is diphenyl methane diiosocyanate (MDI), specifically PAPI™ 2027 polymeric MDI from The Dow Chemical Co. or Rubinate™ 9236 polymeric MDI from ICI Americas. Other acceptable isocyanates are aliphatic or aromatic, linear or branch, substituted or non-substituted, saturated or non-saturated isocyanates with more than one isocyanate functional group.

Alcohol is applied to the isocyanate treated mobile mass of particles for reaction with the excess of isocyanate on the particles to form a urethane that, it is believed, penetrates into and becomes bonded with the biuret. The preferred alcohol is neopentyl glycol. Other acceptable alcohols are aliphatic or aromatic, linear or branch, substituted or non-substituted, saturated or non-saturated alcohols with more than one hydroxyl group.

Tung oil is applied to the mobile mass of nutrient particles for reaction with the urethane, preferably in the presence of a cross-linking initiator or promoter. The acid functional groups of the tung oil react with the urethane and/or isocyanate and initiate free radical cross-linking of the tung oil, which is preferably enhanced with the aid of an initiator or promoter. Other vegetable oils, such as linseed oil, have been tried, but the same do not appear to provide as long a release time as tung oil. Tung oil, which is a hydrophobic polymer having a high melt point and good mechanical and adhesive properties, is therefore preferred.

The preferred initiator is benzoyl peroxide. A cross-linking agent, such as divinyl benzene, may be employed but care should be exercised because of toxicity concerns.

The reaction between the tung oil and the urethane and the cross-linking of the tung oil complete the formation of a water insoluble interpenetrating polymer network on the surface of the nutrient particles, or perhaps more accurately, the transformation of the exterior of the particles into an interpenetrating polymer network that is insoluble in water but biodegradable in soil to release the nutrient to the soil over a period of time. In general, the thicker the network, the longer the release time.

For the sake of convenience and clarity, the application of the constituents to form the water insoluble polymer network has been above described as taking place sequentially. However, the constituents may be applied simultaneously, or in respective groups. In essence, the reactions and polymerizations occur substantially simultaneously. If any of the constituents are in powder or solid form, it will usually be advantageous to blend the same with a liquid constituent before application for purposes of more convenient and more uniform application to the nutrient particles.

In the preferred practice of the invention, liquid isocyanate is first applied to the mobile mass of particles followed by application of a liquid or fluent mixture of alcohol, tung oil and initiator. To expedite the reaction and hasten the cure time, the particles and the polymer network forming constituents are preferably heated to and/or maintained at an elevated temperature in the order of about 85° to 90° C. At this temperature, and with a reasonable proportion of the initiator, cure times are in the order of 4 to 5 minutes.

The proportions of the constituents applied to the nutrient particles to form the polymer network are preferably in the order of from about 48 to about 52% by weight of the isocyanate, about 30% to about 34% by weight of tung oil, about 17 to 18% by weight of alcohol, and from a trace up to about 1% by weight of the initiator. For economically practical cure times, the initiator is preferably present in the order of from about 0.7 to about 0.8% by weight.

The polymer network forming ingredients may be applied to the nutrient particles in amounts comprising from about 1% to about 8% by weight of the treated nutrient particles, depending upon the length of time over which release of the nutrients is desired to occur. For example, a polymer network application of about 3% by weight to a urea fertilizer results in a release time in soil of about 21 days, and an application of about 7½% by weight to the urea fertilizer provides a release time of about 120 days.

At present day prices, these advantageous results are achieved for only a few pennies per pound of fertilizer.

Fertilizer release times are customarily tested by immersion of the treated particulate nutrient in soil in accordance with standard test protocols established by acknowledged industry experts, such as the University of Florida. Alternatively, for a reasonably reliable determination in considerably less time, ten grams of treated fertilizer can be placed in 100 cc of cold water and the release rate and pattern observed and recorded by standard test procedures. Based on comparative tests, one day of release in cold water is approximately equivalent to one week of release in soil.

In one series of tests in water, a fertilizer having 3.3 weight percent of the polymer coating of the invention released about 85% of the nutrient in three days (approximately equivalent to 21 days in soil); and a fertilizer having a 7.3 weight percent of the polymer coating released only 15% of the nutrient in 10 days (approximately equivalent to 70 days in soil by estimation). In another test in water, a urea fertilizer having a 7.3 weight percent polymer coating exhibited a nutrient release of 15% in 10 days, 60% in 14 days, 80% in 17 days, 90% in 19 days and 95% in 21 days; a total equivalent release time in soil of about 140 days. In a controlled test in soil, a urea fertilizer having a three weight percent polymer coating released the nutrient at a rate such that about 62% remained after one week, about 22% remained after two weeks, and about 8% remained after three weeks.

The plant nutrient controlled release interpenetrating polymer network of the invention thus achieves the desired objectives of the industry.

Another coating constituent that may advantageously be employed is a wax, such as parafin, especially when applied before and/or after application of the isocyanate and the alcohol and tung oil mixture. In one example, the application of 0.5% by weight of wax increased the release time of a 1.0% by weight polymer coating from just over one week to almost three weeks.

In addition to the above stated advantages, the method of the invention is fully compatible with conventional methods of manufacturing urea fertilizers and can advantageously constitute a relatively simple add-on to the conventional production line. In particular, the urea particulates discharged from the conventional production line are of reasonably uniform shape and size, have a reasonably low surface area and are discharged at a temperature in the order of about 90° C., which is an ideal temperature for practice of the invention to expedite the polymer reactions and minimize the cure time.

In a presently preferred mode of commercial practice of the method of the invention, a continuous process rotary drum type coater of conventional design is added to the fertilizer production line for reception therefrom of the hot particulates. Suitable exhaust and air make-up systems may be added as needed or desired. The rotating drum provides for continuous flow-through of a mobile, rolling and tumbling mass of particulates. Mounted within the drum are two or more spraying stations for applying a liquid isocyanate and a fluent mixture of alcohol, tung oil and initiator to the particles in the mobile mass of particles. If desired, a spray station for spray application of a wax may also be provided before the isocyanate application station and/or after the alcohol, oil and initiator application station. The rates of spray application of the coating constituents onto the mass of particulates is correlated with the volume of the mass and the transit time of the particulates through the coater to apply to the particulates the desired proportions and weights of the constituents for forming thereon a polymer network of selected weight. The process is continuous and performed economically and expeditiously.

The objects and advantages of the invention have therefore been shown to be attained in a convenient, practical, economical and facile manner.

While certain preferred embodiments of the invention have been herein described, it is to be appreciated that various changes, rearrangements and modifications may be made therein without departing from the scope of the invention as defined by the appended claims.

What is claimed is:

1. A method of treating particulate plant nutrients comprised in whole or in principal part of urea and having urea at or on the exterior surfaces thereof so as to control the rate of release of the nutrient in soil, comprising the steps of creating a mobil mass of nutrient particles, maintaining the mobile mass of particles at a temperature of at least about 85° C., applying to the heated mobile mass of particles an isocyanate reactive with urea in an amount in excess of that required to react with the urea on the surface of the particles, applying to the isocyanate treated mobile mass of particles an alcohol reactive with the excess isocyanate to form a urethane on the surface of the particles, applying tung oil to the isocyanate and alcohol treated mobile mass of particles to react the tung oil with the urethane and isocyanate and to initiate cross-linking of the tung oil, and continuing to maintain the treated particles in a heated mobile mass for a time sufficient to complete the reaction, said steps being effective to transform the surface of the treated particles into an interpenetrating polymer network that is resistant to water and biodegradable in soil to release the nutrient to the soil over a controlled period of time.

2. A method as set forth in claim 1 including the step of applying wax to the mobile mass of particles.

3. A method as set forth in claim 2 including the step of applying wax to the mobile mass of particles before and/or after applying the isocyanate, alcohol and tung oil.

4. A method as set forth in claim 1 wherein the isocyanate is diphenyl methane diisocyanate.

5. A method as set forth in claim 1 wherein the alcohol is neopentyl glycol.

6. A method as set forth in claim 1 including the step of applying an initiator with the tung oil for promoting cross-linking of the tung oil.

7. A method as set forth in claim 6 wherein the initiator is benzoyl peroxide.

8. A method as set forth in claim 1 comprising the steps of first applying isocyanate to the mobile mass of particles and then applying a mixture comprised of tung oil, an alcohol reactive with isocyanate to form a urethane, and an initiator for promoting a reaction between the urethane and the tung oil in order to facilitate cross-linking of the tung oil, the mixture being comprised of a major proportion of tung oil, sufficient alcohol to react with the excess of the isocyanate applied to the particles and a minor proportion of the initiator.

9. A method as set forth in claim 8 wherein the isocyanate is trifunctional diphenyl methane diisocyanate, the alcohol is neopentyl glycol and the initiator is benzoyl peroxide.

10. A method as set forth in claim 1 including the steps of applying the isocyanate, alcohol and tung oil to the particles at rates of application to comprise from about 1% to about 8% by weight of the treated particles.

11. A method as set forth in claim 10 including the steps of applying the isocyanate, alcohol and tung oil to the particles at respective rates of application in the order of about 50% isocyanate, 30% tung oil and 18% alcohol.

12. A controlled release particulate plant nutrient comprising particles of plant nutrient comprised in whole or in principal part of urea and having urea at or on the exterior surfaces thereof and a water resistant biodegradable interpenetrating polymer network reacted with the urea at or on the exterior surfaces and comprised of the reaction product of the urea and an isocyanate reactive with the urea, the reaction product of isocyanate in excess of the amount reacted with the urea and an alcohol reactive with isocyanate to form a urethane, and the reaction product of the urethane and isocyanate with tung oil.

13. A plane nutrient as set forth in claim 12 wherein the isocyanate is diphenyl methane diisocyanate.

14. A plant nutrient as set forth in claim 12 wherein the alcohol is neopentyl glycol.

15. A plant nutrient as set forth in claim 12 wherein the interpenetrating polymer network comprises from about 1% to about 8% by weight of the nutrient particles.

16. A plant nutrient as set forth in claim 15 wherein the interpenetrating polymer network comprises the reaction products of constituents comprised of in the order of about 50% isocyanate, 30% tung oil and 18% alcohol.

17. A plant nutrient as set forth in claim 16 wherein the isocyanate is trifunctional diphenyl methane diiosocyanate and the alcohol is neopentyl glycol.

18. A controlled release plant nutrient comprising particles of plant nutrient comprised in whole or in principal part of urea and having urea at or on the exterior surfaces thereof and a water resistant biodegradable interpenetrating polymer network reacted with the urea at or on the exterior surfaces and comprised of a biuret, a urethane and tung oil cross-linked with the biuret and urethane.

* * * * *